United States Patent [19]

Okada et al.

[11] Patent Number: 5,127,193
[45] Date of Patent: Jul. 7, 1992

[54] WEATHER STRIP FOR MOTOR VEHICLE

[75] Inventors: Masayasu Okada; Hisayuki Kisanuki, both of Inazawa, Japan

[73] Assignee: Toyoda Gosei Co., Ltd., Nishikasugai, Japan

[21] Appl. No.: 669,937

[22] Filed: Mar. 15, 1991

[30] Foreign Application Priority Data

Mar. 16, 1990 [JP] Japan .................................. 2-67787
Aug. 27, 1990 [JP] Japan .................................. 2-225927

[51] Int. Cl.⁵ .............................................. E06B 7/16
[52] U.S. Cl. ......................................... 49/495; 49/479; 49/496; 49/498; 49/506; 264/146; 264/152; 264/261
[58] Field of Search ................. 49/495, 497, 479, 506, 49/491, 498, 496; 264/152 X, 146 X, 261 X

[56] References Cited

U.S. PATENT DOCUMENTS

| 4,496,186 | 1/1985 | Tuchiya et al. |
| 4,769,947 | 9/1988 | Ogawa et al. |
| 4,884,370 | 12/1989 | Nozaki et al. ............ 49/497 X |
| 4,989,371 | 2/1991 | Mancosu et al. ............ 49/497 |

*Primary Examiner*—Philip C. Kannan
*Attorney, Agent, or Firm*—Cushman, Darby & Cushman

[57] ABSTRACT

A weather strip for a motor vehicle includes an extruded weather strip of which an end portion has a width gradually increasing toward an end thereof. The end portion has a slit extending from its end along a root portion of a lip-shaped sealing portion projecting from a base portion thereof, thereby dividing the end portion into two divided portions. The slit is enlarged so as to have a width increasing toward an open end thereof. The enlarged slit is filled with a molded portion so as to connect the two divided portions to each other.

4 Claims, 4 Drawing Sheets

5,127,193

WEATHER STRIP FOR MOTOR VEHICLE

BACKGROUND OF THE INVENTION

1. Field of the Invention:

The present invention relates to a weather strip for a motor vehicle, and more particularly, to a structure of an end portion thereof.

2. Description of the Prior Art:

Weather strips are generally formed by extrusion. The extruded weather strip extends straight and has a uniform cross-section. When an end portion of the weather strip is required to have a cross-section different from that of the remaining portion thereof, the end portion has been conventionally formed by molding.

In the motor vehicle as shown in FIG. 8, in order to seal an edge defining a door opening, and a door frame 30 of a closed door 3, a weather strip is continuously attached along a front pillar 1 and a roof-side portion 2.

As shown in FIG. 9, this weather strip 5 is composed of a first weather strip 5A to be attached along the front pillar 1, and a second weather strip 5B to be attached along the roof-side portion 2, and a molded connecting portion 5C to be attached along a corner portion A of the door opening in FIG. 8.

The first weather strip 5A has a sealing portion 52 of a Pl-shaped cross-section, as shown in FIG. 10. This sealing portion 52 extends from a base portion 51, and is retained by the front pillar 1.

In some types of motor vehicles, the height of a side portion 10 of this pillar 1 gradually increases in an upper corner portion of the pillar 1. In order to improve both an outer appearance and sealing properties of the weather strip 5, it is preferable to gradually increase the height of the sealing portion 52 to match with the increase in height of the side portion 10 of the front pillar 1.

To this end, there has been adopted means of forming a long molded connecting portion 5C, and gradually increasing the height of the sealing portion 52 of the molded connecting portion 5C, as shown in FIG. 11. There has been also adopted another means of cutting off the sealing portion 52 of the end portion of the first weather strip 5A, and forming the sealing portion 52 having a gradually increasing height in the end portion of the first weather strip 5A by molding integrally with the molded connecting potion 5C, as shown in FIG. 12.

Rubber extruded body such as the weather strips 5A, 5B considerably differs from the molded body such as the molded connecting portion 5C in luster and color. Accordingly, in the above-described conventional means wherein a large area of the molded portion is exposed to the outside, the different in luster and color between the extruded portion and the molded portion is clearly perceived so that the outer appearance of the weather strip is deteriorated.

SUMMARY OF THE INVENTION

It is an object of the present invention to provide an extruded weather strip having an molded end portion, of which the cross-sectional shape changes in a longitudinal direction thereof, and of which appearance is improved.

In accordance with the present invention, a slit is formed in an extruded weather strip from its end in a longitudinal direction thereof, the resulting slit is enlarged so that the width of the slit is gradually increased toward the end of the extruded weather strip, and the enlarged slit is filled with a molded portion. This results in an end portion of which the cross-sectional shape gradually changes toward an end thereof being formed in the extruded weather strip.

The present invention can be applied to the formation of both an end portion of a single weather strip and a connecting portion for connecting facing ends of two weather strips.

BRIEF DESCRIPTION OF THE DRAWING

Other objects, features and characteristics of the present invention will become apparent upon consideration of the following description and the appended claims with reference to the accompanying drawings, all of which form a patent of this specification.

DETAILED DESCRIPTION OF THE PRESENTLY PREFERRED EXEMPLARY EMBODIMENTS

FIGS. 1 through 4 illustrate a first embodiment of a structure in accordance with the present invention.

In the motor vehicle, a weather strip is attached along a front pillar and a roof-side portion, which define a door opening of a vehicle body.

Figure 1:
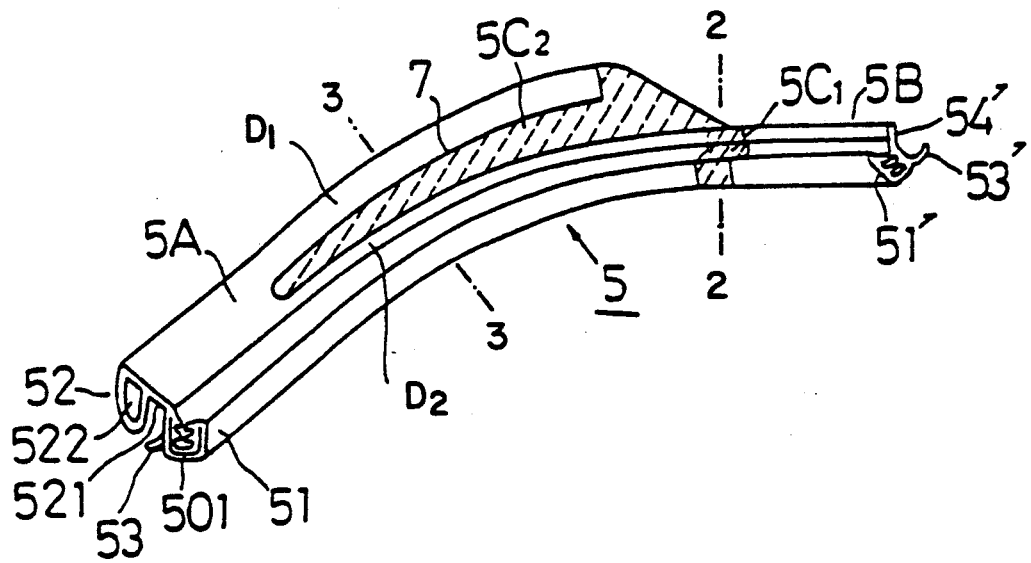
FIG. 1 is a perspective view of a first embodiment of a weather strip, which corresponds to the portion A of FIG. 8.
Figure 8:
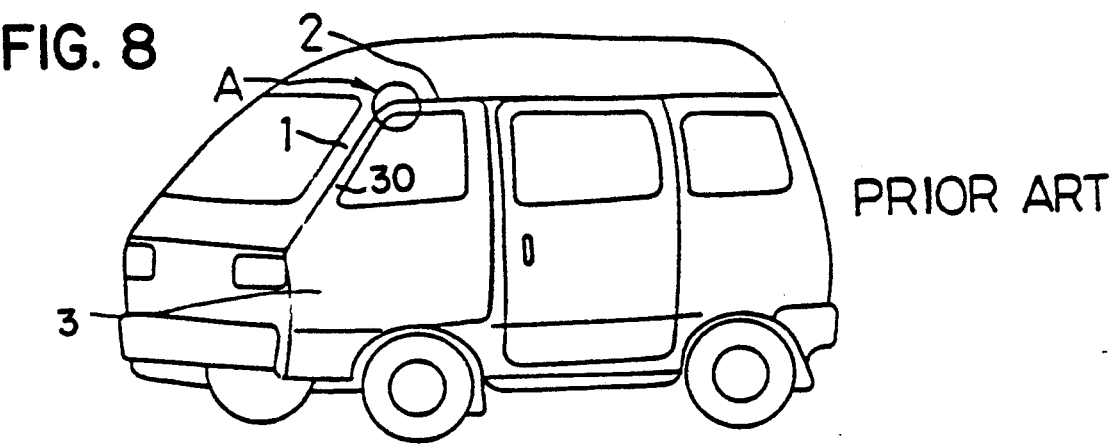
FIG. 8 is a perspective view of a motor vehicle to which a conventional weather strip is attached.
Figure 9:
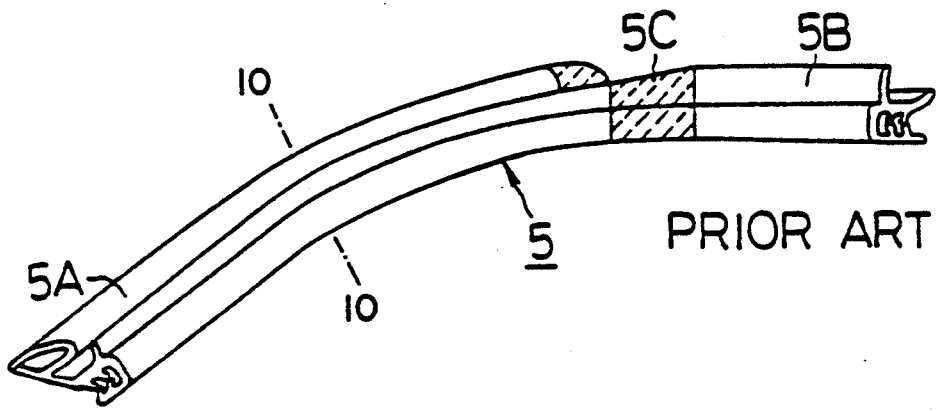
FIG. 9 is a perspective view of a connecting portion of a conventional weather strip.
Figure 10:
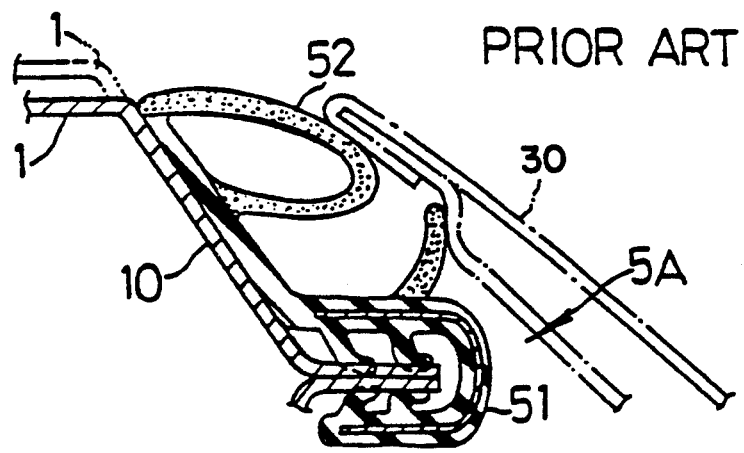
FIG. 10 is a cross-sectional view taken along the line X—X of FIG. 9.
Figure 11:
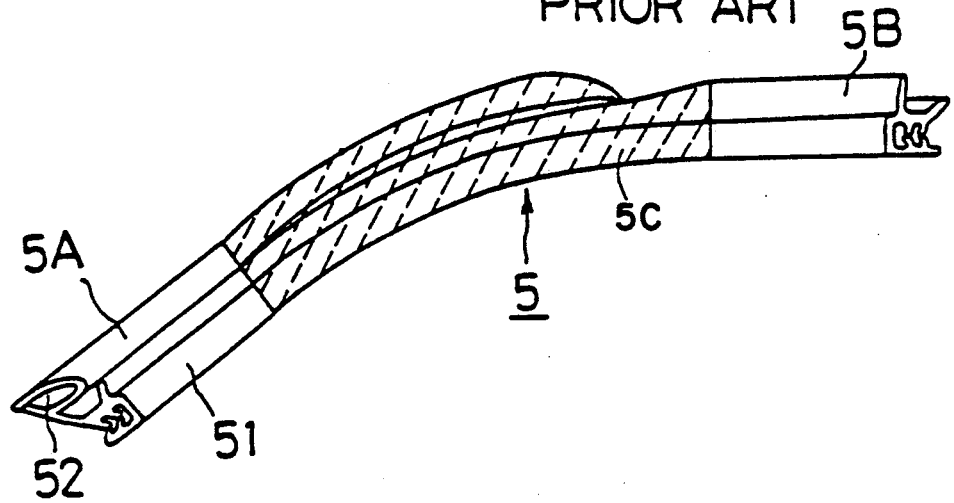
FIGS. 11 and 12 are perspective views, each illustrating a connecting portion of other conventional weather strip.
Figure 12:
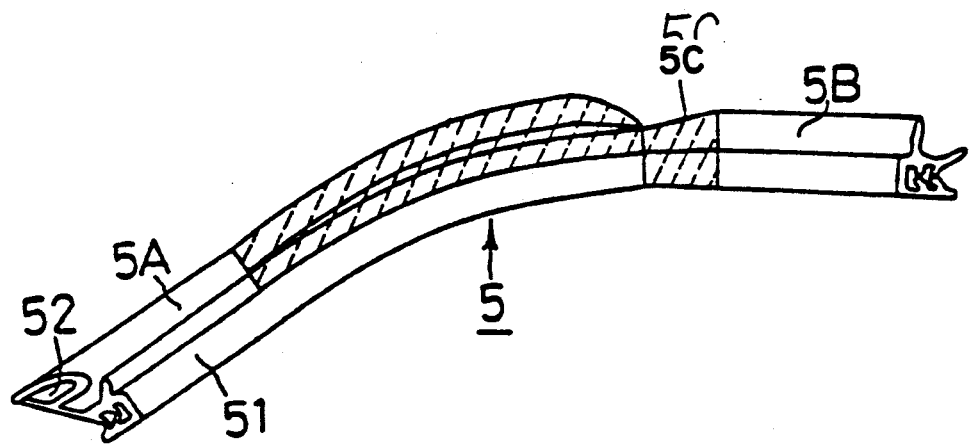

FIG. 1 illustrates a corner portion of the weather strip, which corresponds to the portion A of FIG. 8. A weather strip 5 is composed of a first weather strip 5A to be attached along the front pillar 1, a second weather strip 5B to be attached along the roof-side portion 2, and a molded connecting portion 5C₁ which integrally connects the first and second weather strips 5A, 5B to each other.

Figure 3:
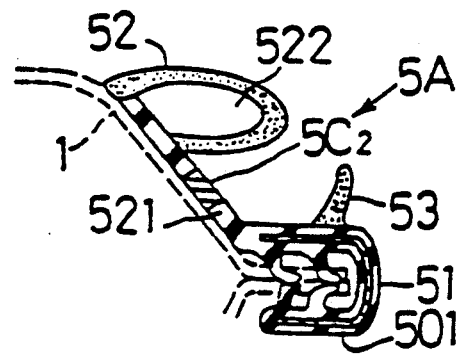
FIG. 3 is a cross-sectional view taken along the line III—III of FIG. 1.

As shown in FIG. 3, the first weather strip 5A is an extruded body, and has a base portion 51 of a U-shaped cross-section, a sealing portion 52 of a P-shaped cross-section, and a sub lip 53. The sealing portion 52 has a leg portion 521 extended from one end of the base portion 51, and a tubular portion 522 formed at an end of the leg portion 521. The sub lip 53 extends from a side surface of the base portion 51. A metal insert 501 is embedded in the base portion 51. The base portion 51, and the leg portion 521 of the sealing portion 52 are made of solid rubber, and the tubular portion 522 of the sealing portion 52 and the sub lip 53 are made of sponge rubber.

The second weather strip 5B to be attached along the roof-side portion 2 is an extruded body, and is provided with a base portion 51' of a cross-sectional shape substantially equal to that of the base portion 51 of the first weather strip 5A, a sealing lip 53' of a cross-sectional shape substantially equal to that of the sub lip 53 of the first weather strip 5A, and a main lip 54' of a cross-sectional shape substantially equal to that of the leg portion 521 of the first weather strip 5A.

The first and second weather strip 5A, 5B are connected by the molded connecting portion $5C_1$. An end portion of the first weather strip 5A curves in conformity to the corner of the door opening, and is connected to the second weather strip 5B through the molded connecting portion $5C_1$. The base portions 51, 51' of this weather strip 5 are attached to a body flange which is continuously formed in the front pillar 1 and the roof-side portion, as shown in FIG. 3. In FIG. 3, only the attached state of the weather strip 5A is illustrated.

The end portion of the first weather strip 5A has a slit 7 which extends from an end of the leg portion 521 in a longitudinal direction, and divides the end portion into two divided portions $D_1$, $D_2$. This slit 7 is enlarged so that the width thereof gradually increases toward its open end, and is completely filled with a molding material. This molding material also closes the opening of the tubular sealing portion 522, thereby forming a molded portion $5C_2$. This results in the height of the sealing portion 52 of the end portion of the first weather strip 5A gradually increasing.

An edge of the molded portion $5C_2$ of the first weather strip 5A gently descends and is integrally connected to the molded connecting portion $5C_1$.

Hereinafter, the method for connecting the weather strips 5A and 5B to each other will be explained.

Figure 4:
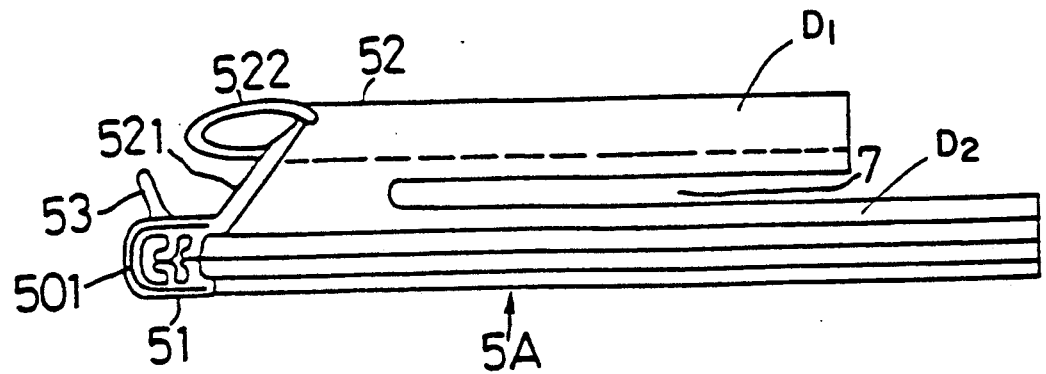
FIG. 4 is a diagram illustrating the first embodiment of the weather strip.

Firstly, the slit 7 having a uniform width is formed in the leg portion 521 of the sealing portion 52 of the first extruded weather strip 5A so as to extend from an end of the leg portion 521 in a longitudinal direction thereof. This slit 7 divides the end portion of the sealing portion 52 into two divided portions $D_1$, $D_2$ which face each other through the slit 7. Then, one divided portion $D_1$ located on the side of the tubular sealing portion 522 is cut off into a shorter length than another divided portion $D_2$, as shown in FIG. 4.

Next, the end portion of the first weather strip 5A is curved in conformity to the corner of the door opening with the sealing portion 52 on the outer diameter side of the corner, and the slit 7 is enlarged so that the width of the slit 7 gradually increases toward the open end thereof.

Figure 2:
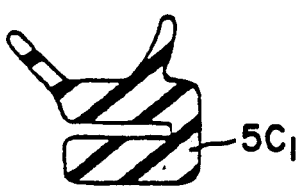
FIG. 2 is a cross-sectional view taken along the line II—II of FIG. 1.

An end of the base portion 51 of the thus prepared weather strip 5A and an end of the base portion 51' of the extruded second weather strip 5B are inserted in a cavity (not shown) of a mold (not shown) so as to face each other through a small distance. Then, a solid rubber material is injected into the cavity. The injected solid rubber material forms the molded connecting portion $5C_1$. The molded connecting portion $5C_1$ has such a cross-sectional shape as to connect the base portion 51 of the first weather strip 5A to the base portion 51' of the second weather strip 5B, as shown in FIG. 2. The injected solid rubber material also fills the slit 7, thereby connecting two divided portions $D_1$, $D_2$ of the end portion of the first weather strip 5A to each other as shown in FIG. 3.

In the first embodiment, the height of the sealing portion 52 of the end portion of the first weather strip 5A changes in conformity to the upper corner portion of the front pillar 1, thereby giving the resulting weather strip a good outer appearance matching with the vehicle body.

Furthermore, in the first embodiment, most of the molded portion $5C_2$ filling the slit 7 is not seen from the outside. Only the short molded connecting portion 5C1 and the end of the molded portion $5C_2$ are exposed so that the difference in luster and color between the extruded portion and the molded portion is not perceived, and accordingly a good outer appearance is obtained.

The weather strip attached along the front pillar is extruded generally so that the sealing portion extends in the direction conforming to the side surface of the front pillar. And when the end portion of thus extruded weather strip is curved along a corner portion of the door opening with the sealing portion on the outer diameter side of the corner portion, the sealing portion slightly leans in a direction apart from the side surface of the front pillar due to a tension applied thereto. Accordingly, when the thus prepared weather strip is attached to the front pillar, the sealing portion does not come into close contact with the upper corner portion of the front pillar, and a gap is likely to be generated therebetween.

Figure 5:
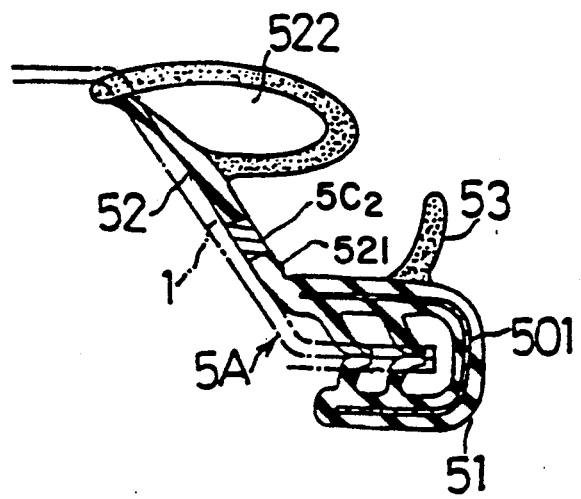
FIG. 5 is a cross-sectional view of a modification of the first embodiment of the present invention.

The first weather strip 5A shown in FIG. 5 overcomes the above inconvenience. The first weather strip 5A is extruded into such a shape that the sealing portion 52 thereof slightly inclines toward the front pillar 1. When the end portion of this extruded first weather strip 5A is curved along the corner portion of the door opening, the sealing portion 52 changes its inclination in conformity to the front pillar 1.

The end portion of the first weather strip 5A which has been curved while keeping its inclination is connected to the second weather strip 5B by molding. The sealing portion 52 of the thus obtained weather strip 5 comes into close contact with the upper corner portion of the front pillar 1.

Figure 7:
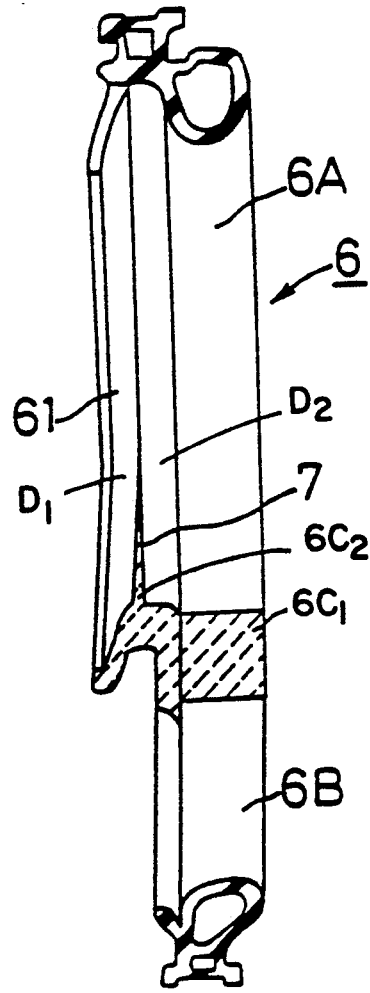
FIG. 7 is a view illustrating the details of the portion B of FIG. 6.
Figure 6:
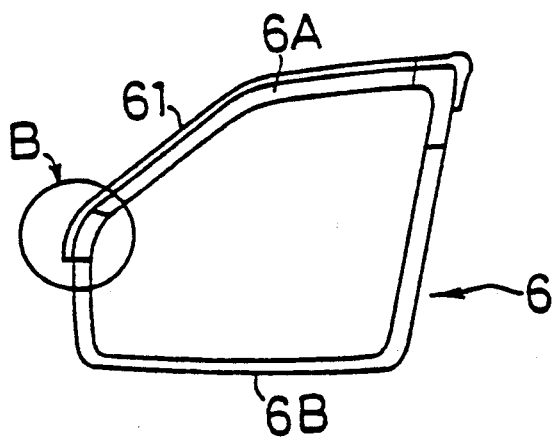
FIG. 6 is a general view of a second embodiment of the present invention, wherein a weather strip is attached around a door of the motor vehicle.

FIGS. 6 and 7 illustrate a second embodiment of the present invention.

As shown in FIG. 6, a door weather strip 6 is continuously attached around a door (not shown). This door weather strip 6 has a lip 61 to come into contact with a drip rail (not shown) formed along an opening edge of a vehicle body.

In the portion B of FIG. 6, wherein an end portion of the lip 61 is located, a space between the door and the facing drip rail is wider than the remaining part of the space surrounding the door in some types of motor vehicles. In such a case it is preferable to increase the height of the end portion of the lip 61.

FIG. 7 illustrates the structure of the portion B of FIG. 6. An extruded first door weather strip 6A is connected to an extruded second door weather strip 6B through a molded connecting portion $6C_1$.

In the first door weather strip 6A, a slit 7 is formed in an end portion of the lip 61 to divide it into two divided portion $D_1$, $D_2$. This slit 7 is enlarged so that the width thereof gradually increases toward its open end. The connecting portion $6C_1$ is formed by molding. At this time, a molding material also fills the enlarged slit 7, thereby forming a molded portion $6C_2$. The height of the end portion of the lip 61 of the prepared first door weather strip 6A gradually increases towards its end because the width of the slit 7 gradually increases towards its end.

The present invention can be applied to the case where two extruded weather strips each having a sealing portion, are connected to each other with the cross-sectional shapes of end portions thereof being respectively changed, and can be also applied to the case where the cross-sectional shape of an end portion of a single weather strip is required to be changed.

What is claimed is:

1. A weather strip for a motor vehicle, including an extruded weather strip of which an end portion is composed of two divided portions separated from each other by a slit, and a molded portion filling said slit, said slit extending from an end of the end portion of the extruded weather strip in a longitudinal direction thereof, said slit having a width increasing toward an open end thereof, and said molded portion filling said slit for connecting said two divided portions to each other, whereby the width of the end portion of the extruded weather strip gradually increases toward an end thereof.

2. The weather strip according to claim 1, wherein the weather strip seals a door opening of a body of a motor vehicle, and a door for closing said door opening, the extruded weather strip is composed of a base portion to be attached along one of an edge of the body of the motor vehicle, which defines said door opening, and a peripheral edge of said door, and a lip-shaped sealing portion which projects from said base portion, said slit extends along a root portion of said sealing portion so as to divide an end portion of the extruded weather strip into two divided portions on the side of said base portion and on the side of said sealing portion.

3. The weather strip according to claim 1, wherein the weather strip is composed of two extruded weather strips, and a molded connecting portion for connecting end portions of the two extruded weather strips, and at least one of said end portions of said two extruded weather strips is provided with said molded portion connecting said two divided portions.

4. The weather strip according to claim 3, wherein said molded connecting portion and said molded portion are continuous and integral with each other.

* * * * *